(12) United States Patent
Porter et al.

(10) Patent No.: US 9,744,710 B2
(45) Date of Patent: Aug. 29, 2017

(54) ASSEMBLY AND PROCESS FOR CREATING AN EXTRUDED PIPE FOR USE IN A GEOTHERMAL HEAT RECOVERY OPERATION

(71) Applicant: U.S. Farathane Corporation, Auburn Hills, MI (US)

(72) Inventors: Steve Porter, Romeo, MI (US); Timothy John Brown, Bruce Township, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 64 days.

(21) Appl. No.: 14/817,278

(22) Filed: Aug. 4, 2015

(65) Prior Publication Data
US 2015/0336318 A1 Nov. 26, 2015

Related U.S. Application Data

(63) Continuation-in-part of application No. 13/726,771, filed on Dec. 26, 2012, now Pat. No. 9,162,387.
(Continued)

(51) Int. Cl.
*B29C 47/02* (2006.01)
*B29C 47/28* (2006.01)
(Continued)

(52) U.S. Cl.
CPC .......... *B29C 47/92* (2013.01); *B29C 47/0023* (2013.01); *B29C 47/0028* (2013.01); *B29C 47/021* (2013.01); *B29C 47/04* (2013.01); *B29C 47/065* (2013.01); *B29C 47/28* (2013.01); *B29C 47/882* (2013.01); *B29C 47/8895* (2013.01);
(Continued)

(58) Field of Classification Search
CPC .............. B29C 47/0028; B29C 47/005; B29C 47/0052; B29C 47/02; B29C 47/0059; B29C 47/0064
See application file for complete search history.

(56) References Cited

U.S. PATENT DOCUMENTS 3,057,013 A 10/1962 Loveless
3,473,194 A 10/1969 Farrow
(Continued)

FOREIGN PATENT DOCUMENTS

CH 658513 A5 11/1986
DE 19625114 A1 12/1997
(Continued)

*Primary Examiner* — William Bell
(74) *Attorney, Agent, or Firm* — Dinsmore & Shohl LLP

(57) ABSTRACT

An assembly and process for forming a two stage extruded pipe having a central inner sleeve and a pair of outer attached lobes. The central sleeve shaped (also termed a grout receiving tube) is produced in an initial extrusion operation, following which it enters a cross head operation where a pair of outer lobes are attached to cross sectional exterior surface locations according to a second stage extrusion operation so as to be integrally formed therewith. Other steps include cooling of the dual stage extruded pipe, as well as sectioning and stacking the pipe. Additional steps include forming elongated slots or apertures into the central sleeve portion of the finished extrusion, such in non-interfering fashion with the individual passageway defining and lobes.

11 Claims, 15 Drawing Sheets

Related U.S. Application Data

(60) Provisional application No. 61/586,464, filed on Jan. 13, 2012.

(51) Int. Cl.

| | |
|---|---|
| *B29C 47/92* | (2006.01) |
| *B29C 47/88* | (2006.01) |
| *B29C 47/04* | (2006.01) |
| *F24J 3/08* | (2006.01) |
| *B29C 47/06* | (2006.01) |
| *B29C 47/90* | (2006.01) |
| *B29C 47/00* | (2006.01) |
| *B29L 23/00* | (2006.01) |
| *B29K 23/00* | (2006.01) |
| *B29C 47/10* | (2006.01) |
| *F28F 21/06* | (2006.01) |

(52) U.S. Cl.
CPC ............... *B29C 47/90* (2013.01); *F24J 3/083* (2013.01); *B29C 47/003* (2013.01); *B29C 47/0052* (2013.01); *B29C 47/0059* (2013.01); *B29C 47/0064* (2013.01); *B29C 47/0066* (2013.01); *B29C 47/0071* (2013.01); *B29C 47/1036* (2013.01); *B29C 47/884* (2013.01); *B29C 47/8835* (2013.01); *B29C 47/904* (2013.01); *B29C 47/906* (2013.01); *B29C 47/908* (2013.01); *B29C 2947/92209* (2013.01); *B29C 2947/92647* (2013.01); *B29C 2947/92704* (2013.01); *B29K 2023/065* (2013.01); *B29L 2023/22* (2013.01); *F28F 21/062* (2013.01); *Y02E 10/125* (2013.01); *Y02P 70/26* (2015.11)

(56) References Cited

U.S. PATENT DOCUMENTS

| | | | |
|---|---|---|---|
| 3,928,903 | A | 12/1975 | Richardson et al. |
| 3,941,157 | A * | 3/1976 | Barnett ............... B29C 47/0028 138/115 |
| 4,157,194 | A | 6/1979 | Takahashi |
| 5,626,807 | A | 5/1997 | O'Halloran |
| 6,620,354 | B1 | 9/2003 | Bessemer et al. |
| 8,262,322 | B2 | 9/2012 | Desmeules |
| 2010/0180593 | A1 | 7/2010 | Schaller et al. |
| 2011/0011558 | A1 | 1/2011 | Dorrian et al. |
| 2011/0232795 | A1 | 9/2011 | Hardin |
| 2012/0125560 | A1 | 5/2012 | McKeown et al. |
| 2012/0186672 | A1 | 7/2012 | Fisenko et al. |
| 2012/0282032 | A1 | 11/2012 | Desmeules |
| 2012/0312016 | A1 | 12/2012 | Lawes |
| 2013/0101492 | A1 | 4/2013 | McAlister |

FOREIGN PATENT DOCUMENTS

| | | |
|---|---|---|
| EP | 2208954 A2 | 7/2010 |
| EP | 2385328 A2 | 11/2011 |
| GB | 1154259 A | 6/1969 |
| JP | 02-011218 | 1/1990 |

\* cited by examiner

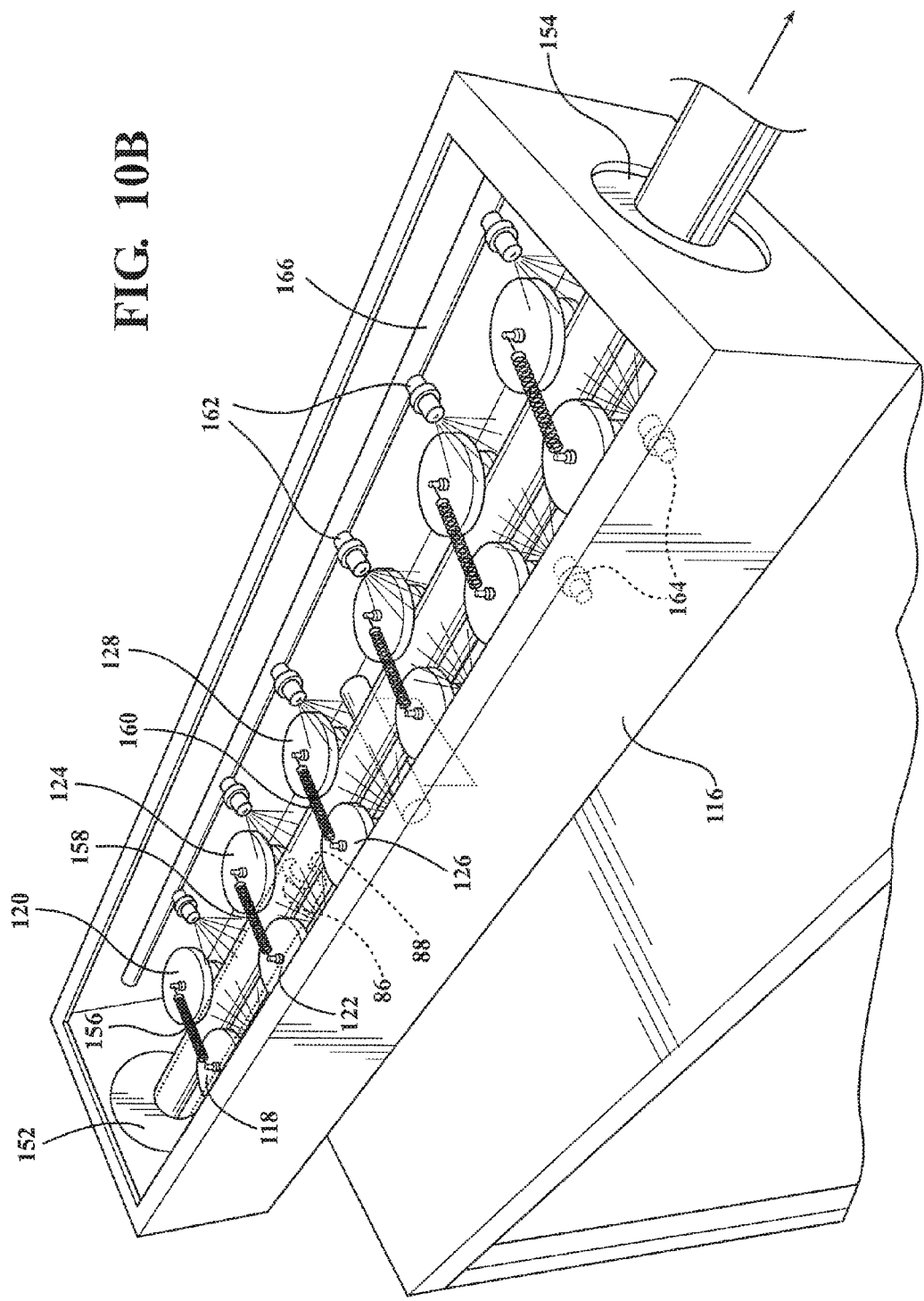

US 9,744,710 B2

ASSEMBLY AND PROCESS FOR CREATING AN EXTRUDED PIPE FOR USE IN A GEOTHERMAL HEAT RECOVERY OPERATION

CROSS-REFERENCE TO RELATED APPLICATIONS

This Application is a Continuation-in-part of application Ser. No. 13/726,771 filed on Dec. 26, 2012. Application Ser. No. 13/726,771 claims the benefit of U.S. Provisional Application 61/586,464 filed on Jan. 13, 2012, the contents of which are incorporated herein in their entirety.

FIELD OF THE INVENTION

The present invention discloses both an assembly and process for sequential two stage extrusion of a geothermal pipe from a plasticized material, such as including but not limited to HDPE (high density polyethylene) pipe.

BACKGROUND OF THE RELEVANT ART

Geothermal heat recovery operations (also termed as a geothermal heat pump or ground source heat pump) are known in the art and which can provide for either of heating or cooling by pumping heat to or from a subterranean zone beneath a ground surface and by which the relevant assembly employed uses the earth as a heat source (in the winter) or a heat sink (in the summer). In application, geothermal systems are designed to take advantage of the moderate temperatures in the ground to boost efficiency and reduce the operational costs of heating and cooling systems. Ground source heat pumps are also known as "geothermal heat pumps" although, strictly, the heat does not come from the centre of the Earth, but from the Sun. They are also known by other names, including geoexchange, earth-coupled, earth energy systems.

Depending on latitude, the temperature beneath the upper 6 meters (20 ft) of Earth's surface maintains a nearly constant temperature between 10 and 16° C. (50 and 60° F.), if the temperature is undisturbed by the presence of a heat pump. Like a refrigerator or air conditioner, these systems use a heat pump to force the transfer of heat from the ground. Heat pumps can transfer heat from a cool space to a warm space, against the natural direction of flow, or they can enhance the natural flow of heat from a warm area to a cool one.

The core of the heat pump is a loop of refrigerant pumped through a vaporcompression refrigeration cycle that moves heat. Seasonal variations drop off with depth and disappear below 7 meters (23 ft) due to thermal inertia. Like a cave, the shallow ground temperature is warmer than the air above during the winter and cooler than the air in the summer. A ground source heat pump extracts ground heat in the winter (for heating) and transfers heat back into the ground in the summer (for cooling). Some systems are designed to operate in one mode only, heating or cooling, depending on climate.

SUMMARY OF THE INVENTION

The present invention discloses both an assembly and process for sequential two stage extrusion of a geothermal pipe from a plasticized material, such as including but not limited to HDPE (high density polyethylene) pipe. A central sleeve shaped and grout receiving tube is produced in an initial extrusion operation. The central sleeve is shaped and cooled, following which it enters a cross head operation where a pair of outer lobes are attached to exterior surface locations of the central sleeve according to a secondary extrusion operation so as to be integrally formed therewith. Other steps include linearly drawing and any of spray, immersion or other types of cooling of the dual stage or co-extruded pipe, as well as sectioning and stacking the pipe. Additional steps include forming elongated slots or apertures into the central sleeve portion of the finished coextrusion in non-interfering fashion with the second arcuate shaped lobes.

Each of guide shape retention, cold-water spray or immersion hardening, cutting and cross drilling steps are provided for creating a plurality of individual sections which are on site assembleable, such as utilizing hot plate welding technique. Additional top and bottom affixed caps are affixed to ends of the elongate assembled piping and, upon embedding the assembly within a ground location in interfacing fashion with a geothermal environment, provide for temperature alteration of the inner communicated fluid flow prior to delivery to a suitable piece of heat expansion and energy transfer equipment, such as for creating electricity.

BRIEF DESCRIPTION OF THE DRAWINGS

Reference will now be made to the attached drawings, when read in combination with the following detailed description, wherein like reference numerals refer to like parts throughout the several views, and in which:

FIGS. 10A and 10B are a pair of rotated and downward looking perspective views of the cooling and shaping tank of FIG. 10 and further illustrating the coolant apertures pathways formed within the elongated mandrels, as well as showing the pairs of spaced apart guiding spindles for assisting in transitioning the two stage extruded pipe from the lobe forming mandrels;

DETAILED DESCRIPTION OF THE PREFERRED EMBODIMENTS

As previously described, the present invention discloses a process incorporating a sequential two stage extrusion process for creating such as a polymeric type pipe which can be utilized in a geothermal fluid flow application. In one non-limited application, an HDPE (high density polyethylene) material is employed, such as which is fed in pelletized, granulated or other flowable form to in-feed hoppers associated with each of a first or main extruder and a second stage extruder in order to create the two stage extruded pipe construction.

It is further envisioned that other material constructions can be employed in the multi-stage extrusion process and in order to create a plurality of interconnecting pipe sections which are suitable for communicating a steady fluid (e.g. water, water based refrigerant or other suitable thermal conveying fluid) downwardly and successively upwardly along the running length of the embedded pipe and in order to take advantage of the geothermal gradient existing at certain locations for modifying a feed temperature of the fluid. In practice, the fluid is typically warmed (or cooled in the instance of a hot fed water input) to a general temperature range of 57° F., consistent with a typical geothermal gradient occurring within the earth crust and, upon being recovered from an outflow location of the uppermost pipe section, is usually fed into a fluid transfer/heat expansion mechanism for recovering a work output (e.g. electricity).

Figure 1:
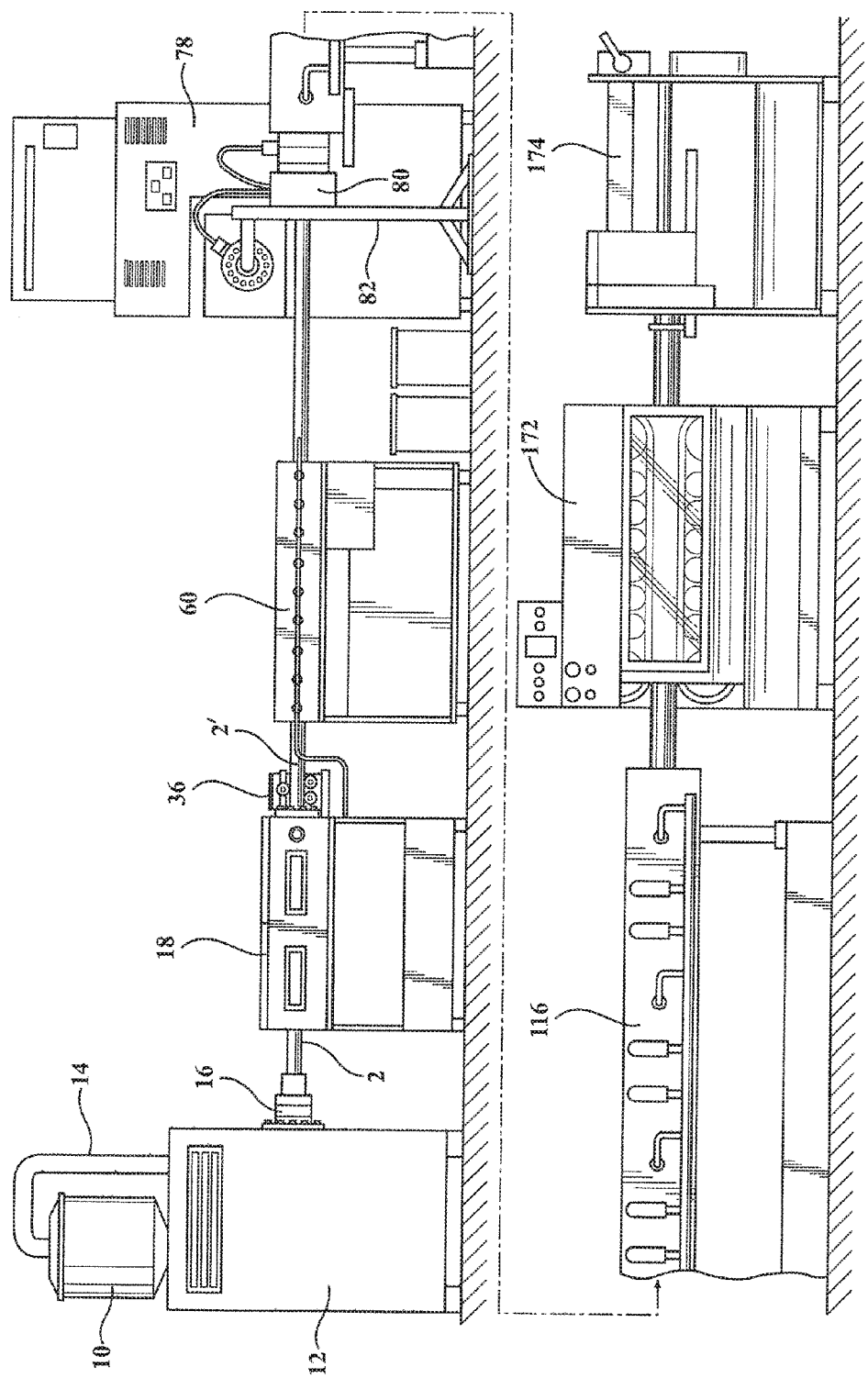
FIG. 1 is plan schematic of the overall assembly and process according to the present invention.
Figure 2:
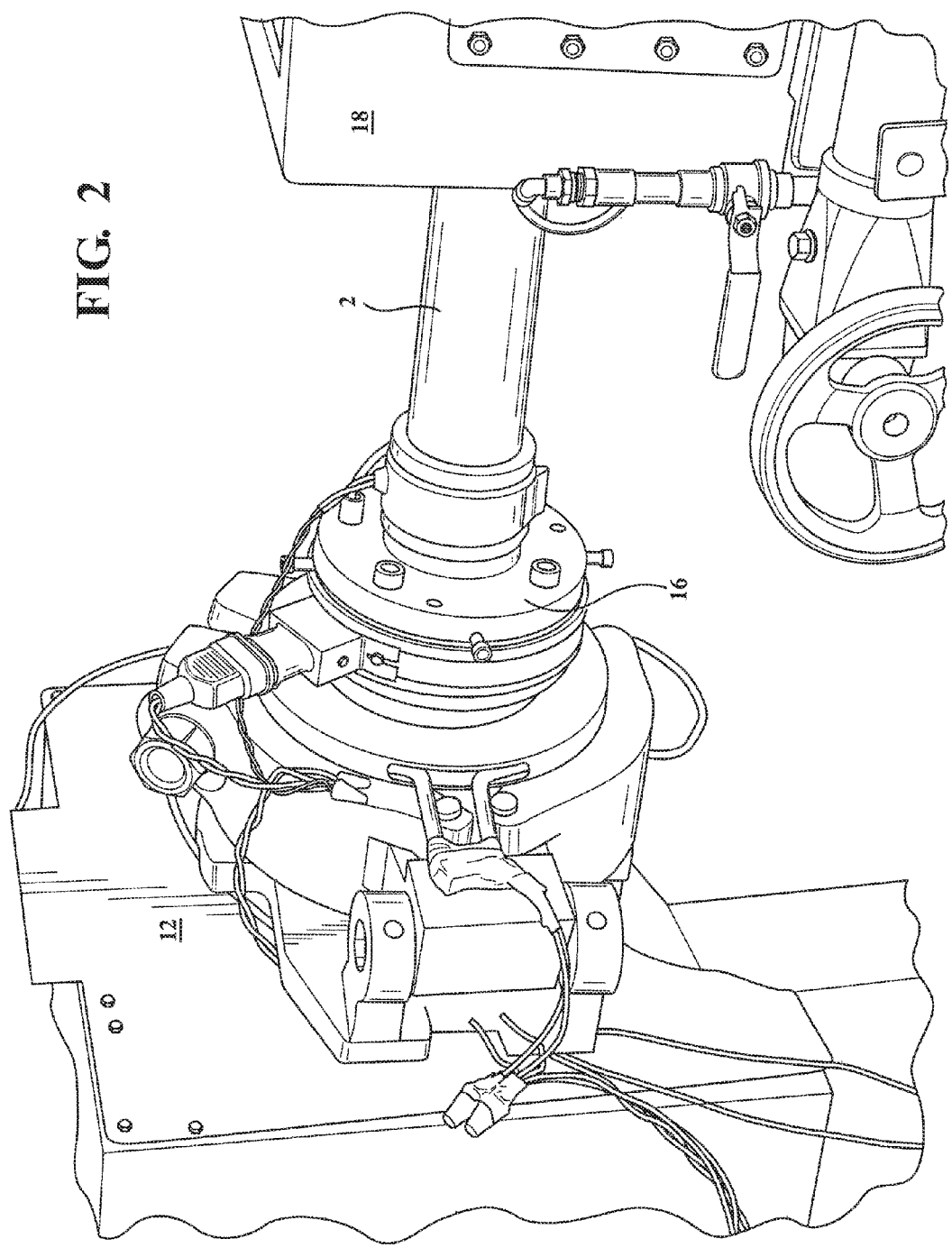
FIG. 2 is a perspective illustration of the first stage extruder for forming the central sleeve.
Figure 3:
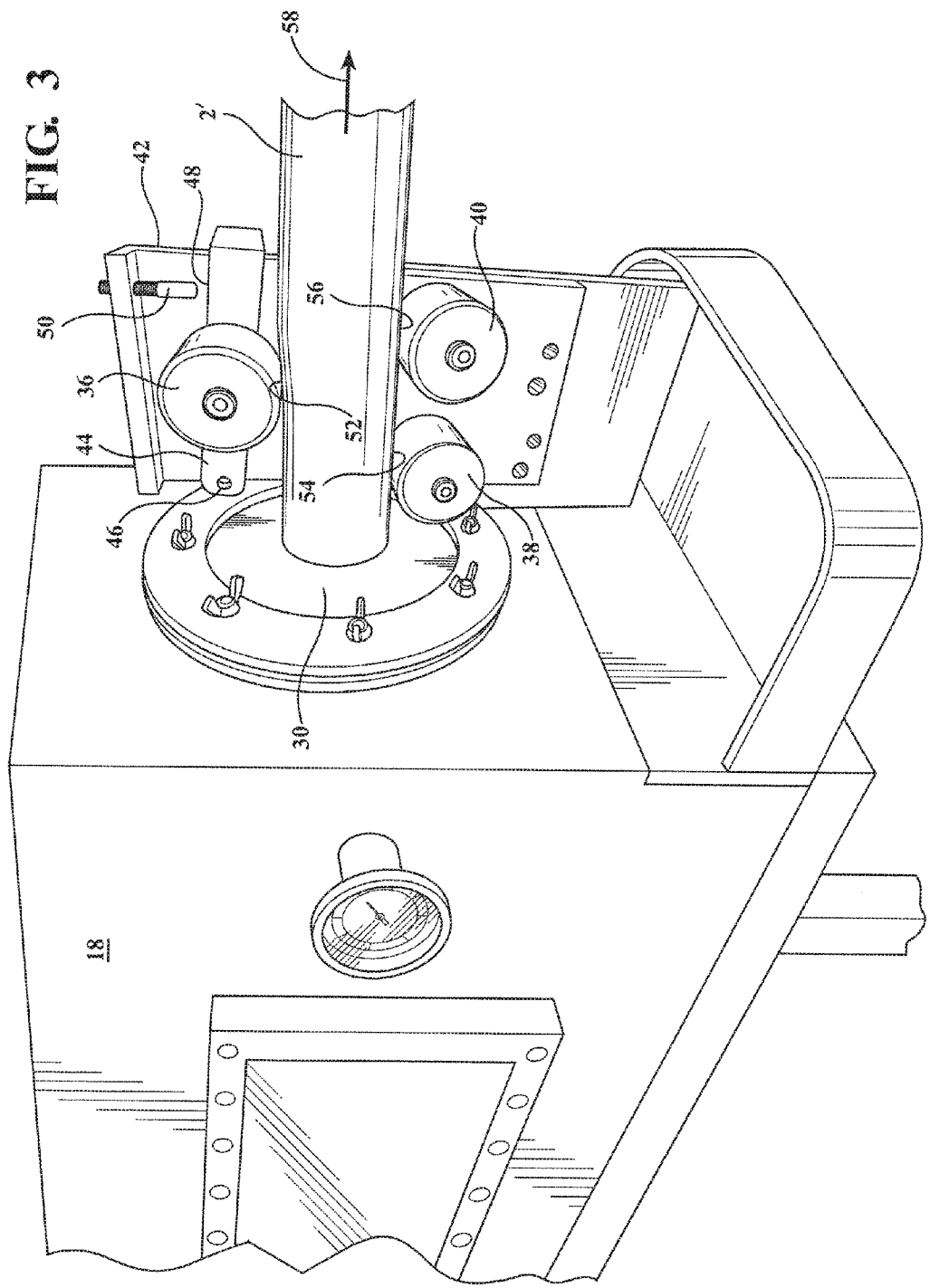
FIG. 3 is an illustration of a vacuum chamber through which the central sleeve passes after exiting the central sleeve extruder, an arrangement of upper and lower rollers communicating with the central sleeve at an outlet of the vacuum chamber for imparting a cross sectional profile, such in order to compensate for heat induced deformation of the sleeve during the subsequent crosshead die operation for extrusion forming the lobes upon exterior locations of the central sleeve.
Figure 12:
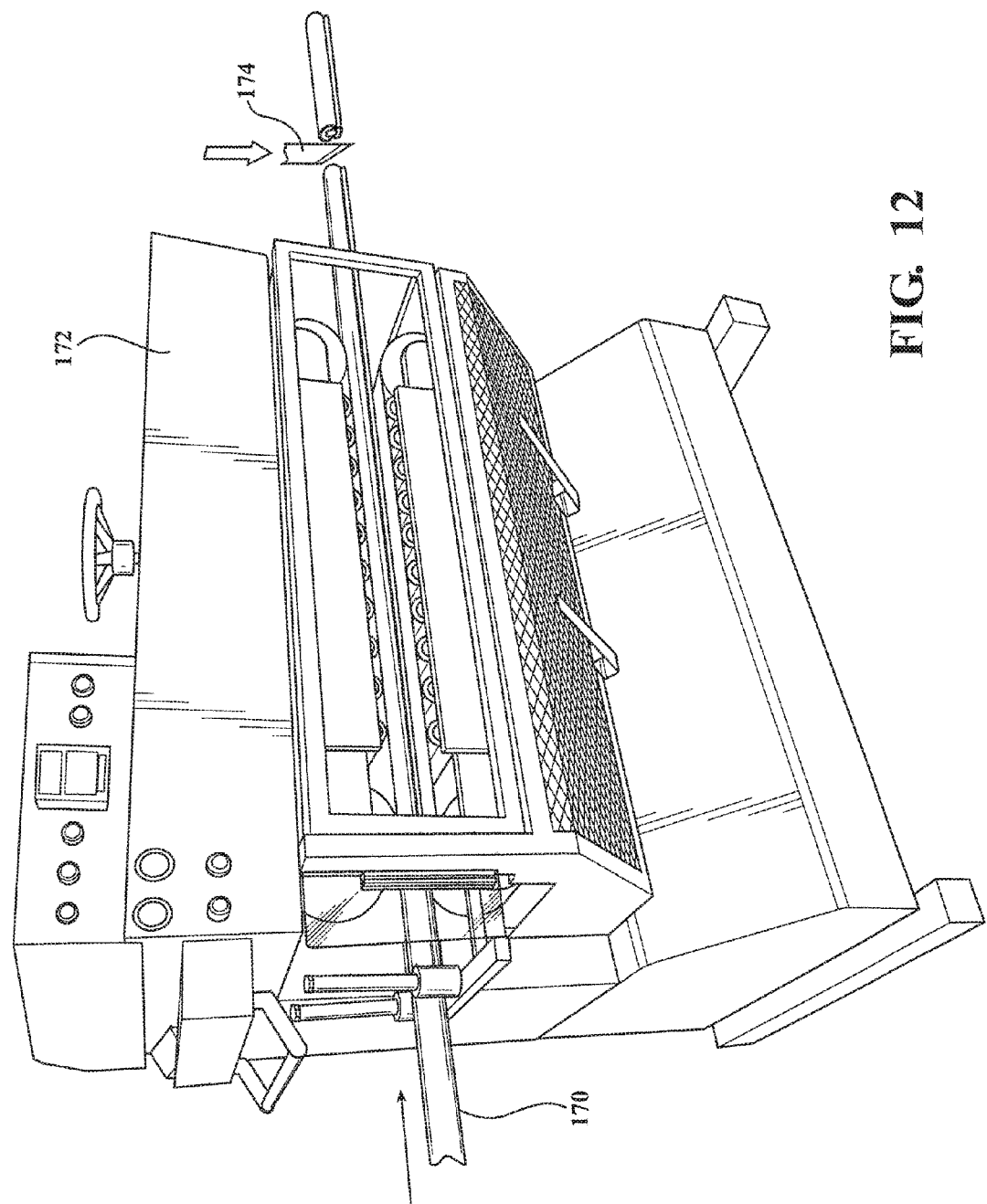
FIG. 12 is a puller assembly for assisting in drawing of the dual stage extruded pipe and which precedes a press for sectioning the finished pipe into predetermined lengths.
Figure 13:
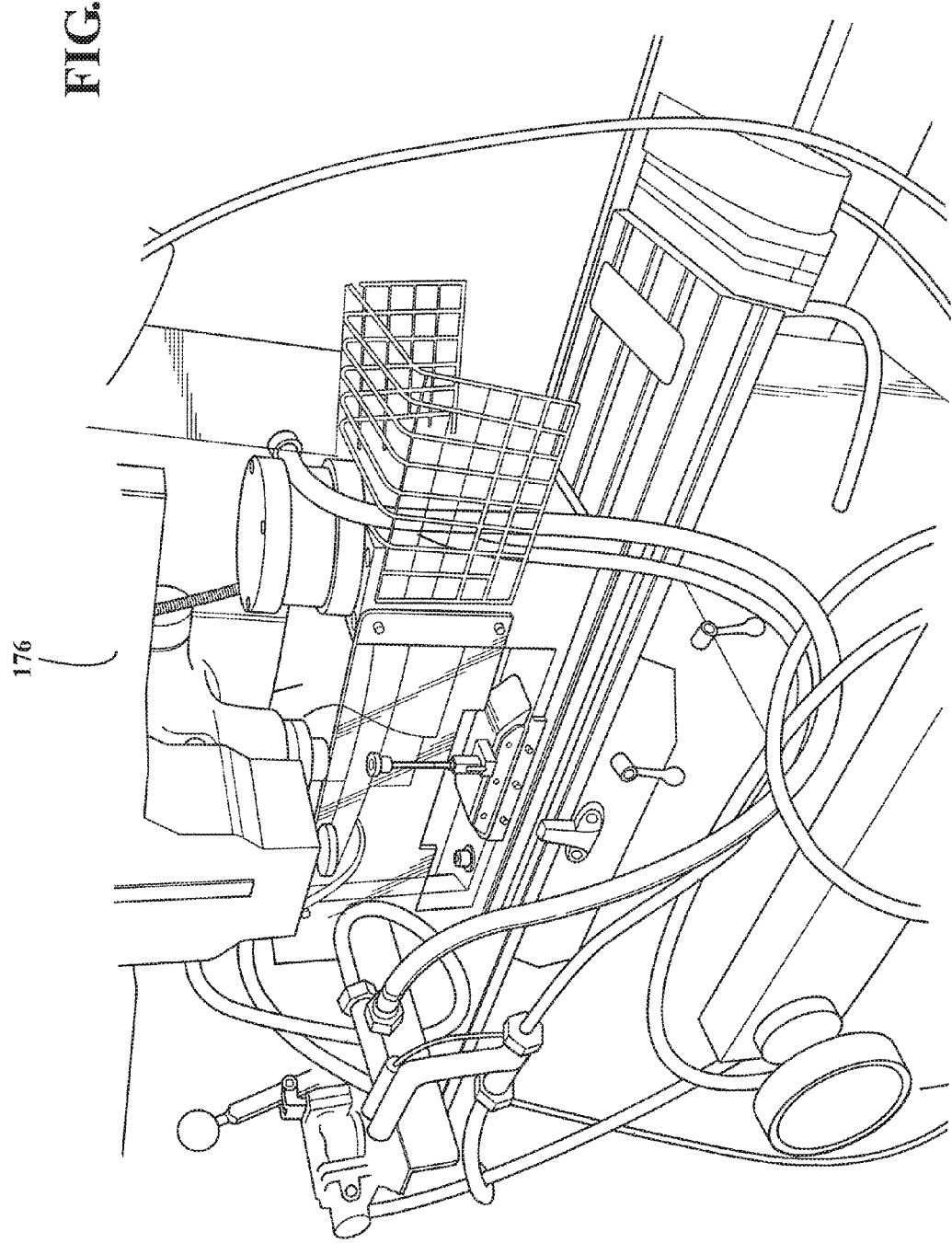
FIG. 13 is a router station for configuring any type of aperture or slot shaped channel within the exposed linear extending portion of the central sleeve, such as for facilitating grout outflow during in ground installation.

Referring to FIG. 1, an overall schematic of the overall assembly and process is shown according to one non-limiting embodiment of the present inventions, these being further described in detail with additional reference to succeeding FIGS. 2-11, as well as additional post extruding and sectioning/routing stations set forth in FIGS. 12 and 13 respectively. A feed hopper assembly 10 contains a volume of extrudate material (again such as including but not limited to HDPE which can be in pellet or granulate four) and which is fed into a first or main extruder 12 via a feed line 14.

An extrusion die (also termed any of a forming head or first mandrel) is shown at 16 associated with the first extruder 12 (see also FIG. 2) and which is heated and temperature controlled as known in the art in order to extrude a first sleeve shaped component 2 of the pipe (such also termed a main tube or central sleeve) in a first extrusion operation. As again shown in FIG. 2, a known arrangement of heating elements, thermo-electric coupling devices and other controls are provided in order to extrude the first sleeve shaped component 2 through a disk shaped template configured within the forming head 16, such exhibiting a desired wall thickness and dimensions.

A vacuum chamber 18, which is depicted as having a generally three dimensional and rectangular shape, is provided in communication with an outlet of the first extruder 12 and for receiving the first sleeve shaped component 2. As further shown in FIG. 3, the vacuum chamber 18 includes a hinged lid 20 which, upon opening, reveals a plurality of disk shaped forming dies 22, 24, 26 arranged in linearly spaced fashion between inlet 28 and outlet 30 ends of the chamber 18.

Figure 4:
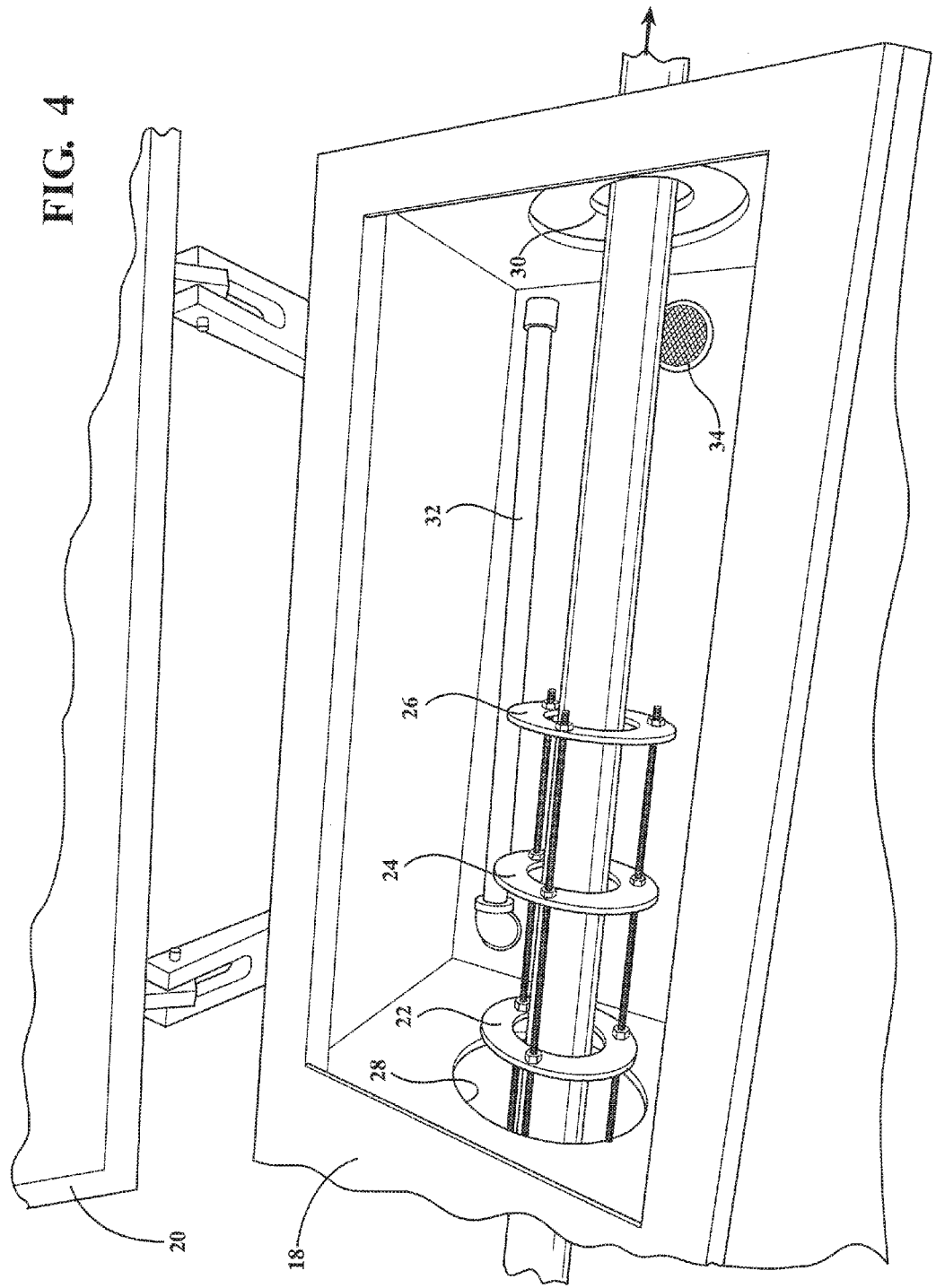
FIG. 4 is an illustration of an interior of the vacuum chamber of FIG. 3 and which depicts a plurality of progressing sizing dies for maintaining the central sleeve in its proper shape during cooling thereof.

The vacuum chamber 18 operates create a desired negative pressure within its interior (see extending fixture 32 and air evacuation passageway 34 in FIG. 4) this in order to maintain the sleeve shaped component 2 in its proper shape while it cools. Located an exterior of the chamber 18, in intercepting proximity to its outlet 30, are upper 36 and lower 38 and 40 spaced apart rollers, these further being rotatably supported upon a vertical shelf or bracket 42. The sleeve shaped component 2, upon exiting the vacuum chamber 18, is intercepted between the lower rollers 38/40 (such as shown in fixed rotational support with the shelf 42) and the upper roller 36 which is both rotatably and pivotally supported a limited distance to a further bracket 44, in turn having an end pivot location 46 and an opposite (free end) abutment location 48, see further upper adjustable end stop 50 extending downwardly from the uppermost end of the shelf 42.

The purpose of the upper 36 and lower 38/40 spaced rollers is to flatten the first sleeve shaped component at first 52 and second 54/56 cross sectional locations as it passes through the rollers and so that the component acquires a modified cross sectional profile 2'. The purpose of employing the rollers and of imparting the offset/flattened shaping to the profile 2' has been found through trial and experimentation to compensate for additional deformation experienced by the inner or sleeve shaped profile as it passes through the subsequent second extrusion stage crosshead die in proximity to the pair of elongated mandrels during the extruding of the exterior lobes. For purposes of the present description, the use of the rollers 52 and 54/56 is optional (see again FIG. 4 which does not include a roller arrangement supported at an exterior outlet of the vacuum chamber 18) and it is further understood that other mechanisms are envisioned according to one of ordinary skill in the art for purposes of introducing an offset to the elongated profile 2 while it is still in a heated and formable shape.

Following exiting of the vacuum chamber 18 and passing through the shape offset upper roller 36 and lower rollers 38/40, (see arrow 58 in FIG. 3), the now deformed single walled pipe 2' is fed through a cooling tank 60 (FIG. 5) for further cooling the pipe or central sleeve utilizing a water spray. To this end, a plurality of nozzles 62 are arranged in inward opposing fashion along each of the opposite length extending sides of the cooling tank, with water (or other coolant fluid) being communicated through lines (see at 64) which supply the plurality of spray nozzles.

Figure 5:
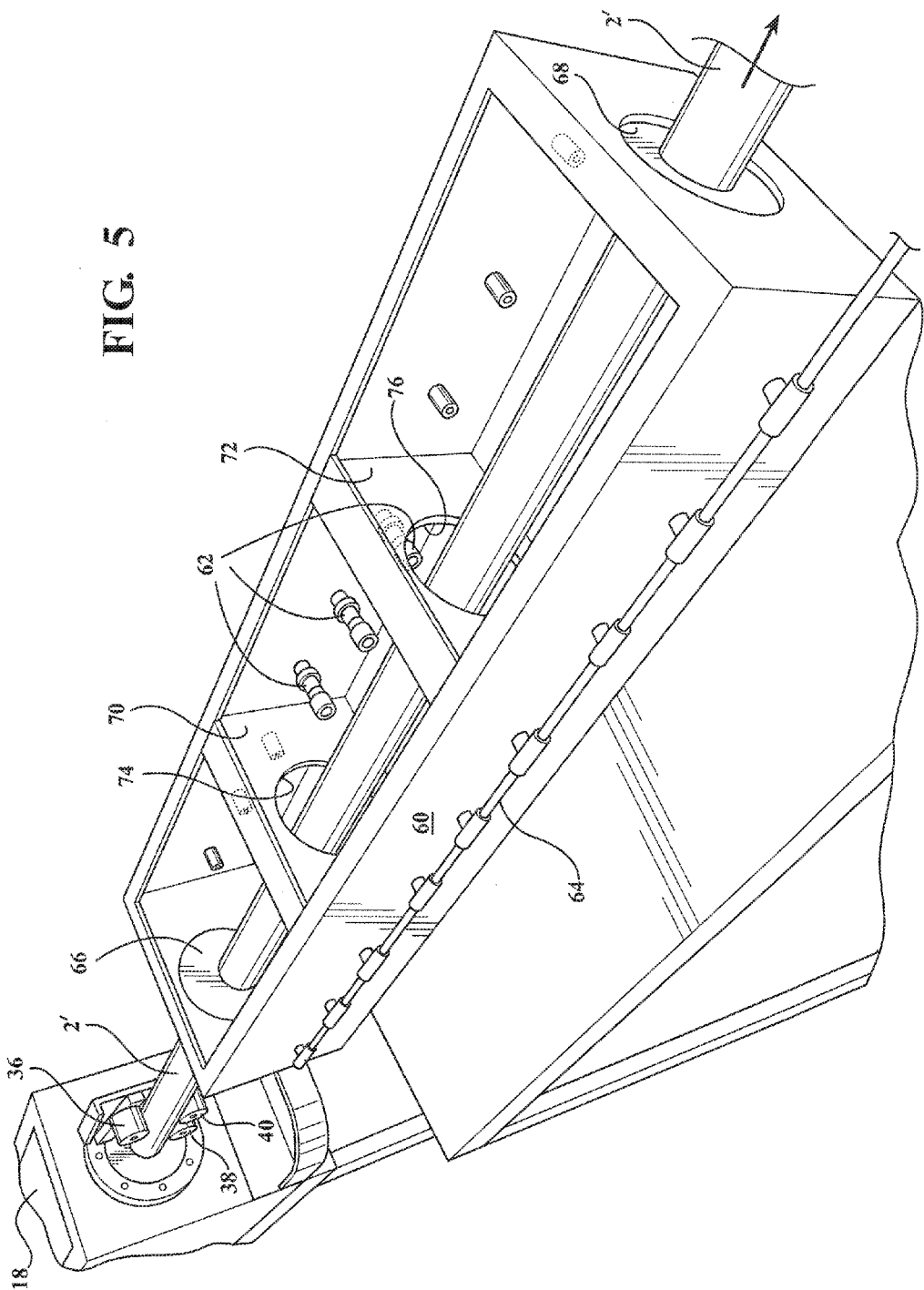
FIG. 5 is a succeeding secondary cooling tank operation for further cooling the central sleeve utilizing a water spray.
Figure 6:
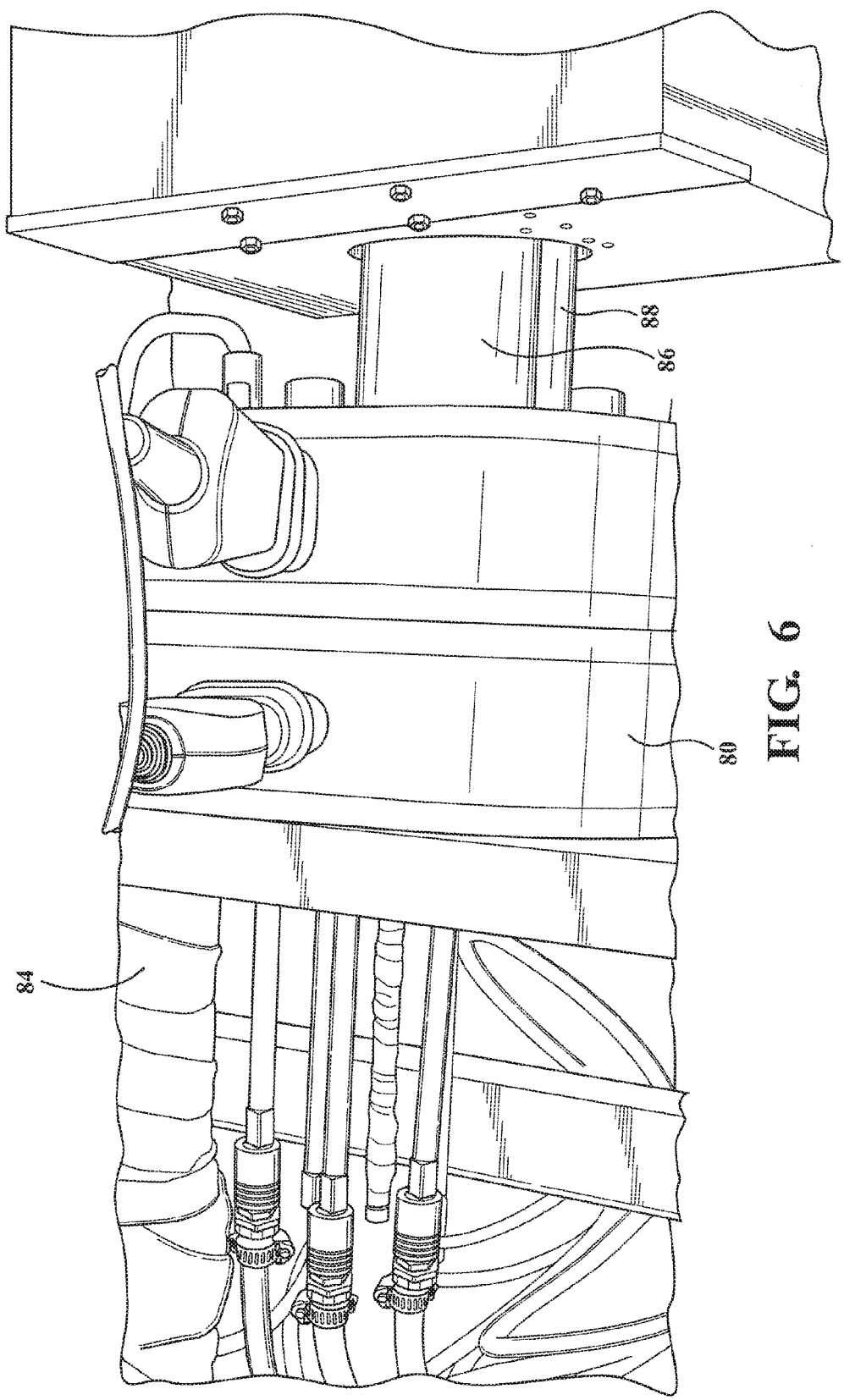
FIG. 6 is a first overhead perspective illustration of a cross head die operation following the second cooling tank, the cross head die including a pair of spaced and elongated mandrels between which traverses the central sleeve to facilitate the second extrusion forming the outer lobes.

As further shown in FIG. 5, the cooling station 60 (optional) includes inlet 66 and outlet 68 ends through which the single walled pipe passes. Additional partitions 70 and 72 are defined at interior locations of the cooling station 60 and include additional aligning passageways (at 74 and 76, respectively) through which pipe 2' passes during cooling and solidifying.

Referring again to FIG. 1, in combination with FIGS. 6-9, a second stage or co-extruder station 78 is located downstream of the main extruder 12 and, in the illustrated embodiment, beyond the optional cooling tank 60. The second stage extruder 78 includes a cross head die 80 supported in elevated fashion upon a stand 82 and so as to be arranged in horizontal alignment with the single walled pipe.

Figure 8:
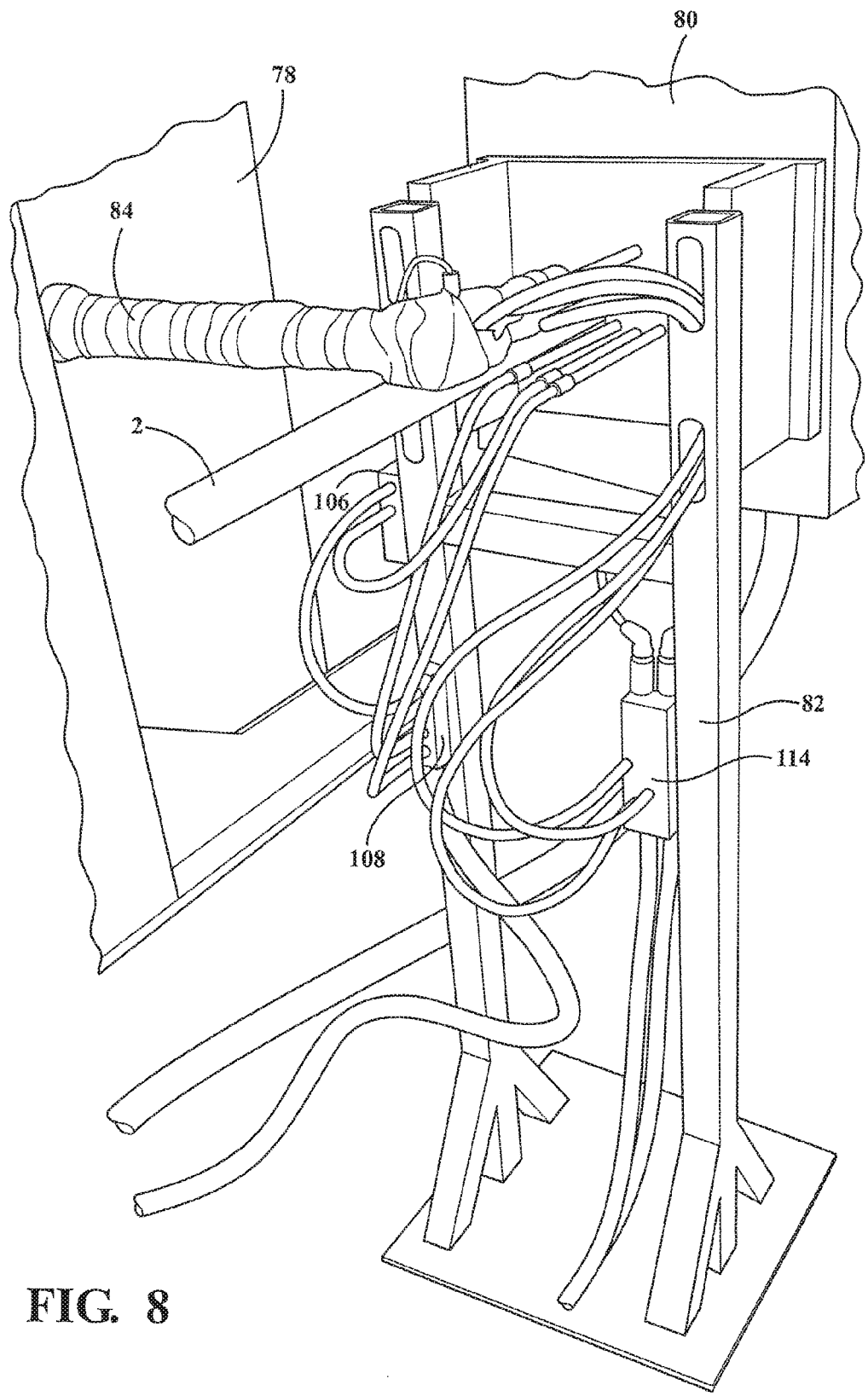
FIG. 8 is a back side perspective of the cross head die and stand and illustrating the arrangement of the inlet feed of coextruded and flowable material to the reverse side extending mandrels, as well as the plurality of coolant lines extending from the thermocouple controlled sub-assemblies for controlling the temperature profiles of the mandrels.
Figure 9:
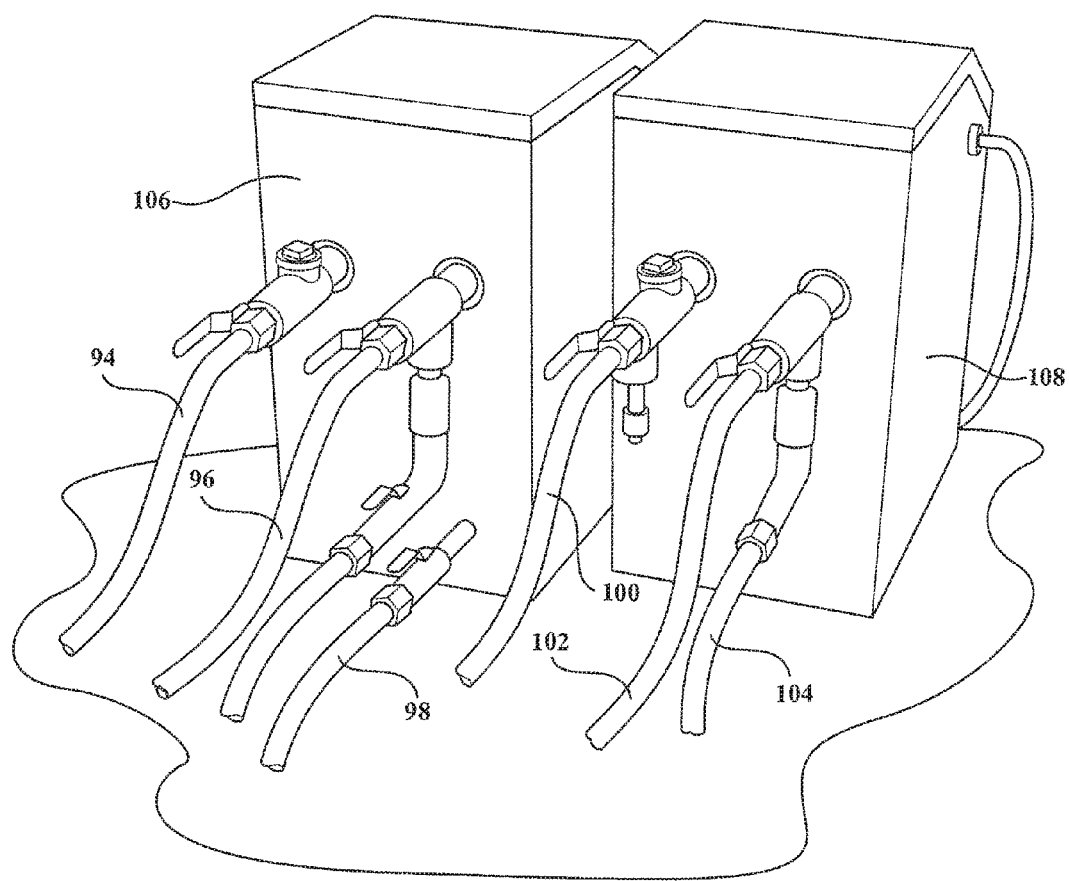
FIG. 9 is a side-by-side perspective of the coolant supply units also depicted in FIG. 8 and associated with the coolant lines and thermos-electric coupling devices extending to each lobe forming mandrel.

A second extruded material is fed from the second stage extruder 78 (such again including a melted and flowable HDPE or other suitable plastic) from a pipe or conduit (see at 84) in FIG. 8 to the cross head die 80 and so that the extrudate material flows through an internal template (not shown) defined within the cross die head. The second extruder also includes a pair of elongated mandrels 86 and 88 (such as which are constructed of any aluminum or other suitable metal or like material) which extend from an outlet of the cross head die 80 and between which communicates the sleeve shaped component 2.

The mandrels 86 and 88 (see as also shown in succeeding FIGS. 10, 10A and 10B) each exhibit an arcuate or other configured cross sectional profile. In the illustrated embodiment, the mandrels are configured so as to extrude a pair of kidney or lobe shaped profiles onto the exterior of the previously extruded single walled pipe.

Figure 10:
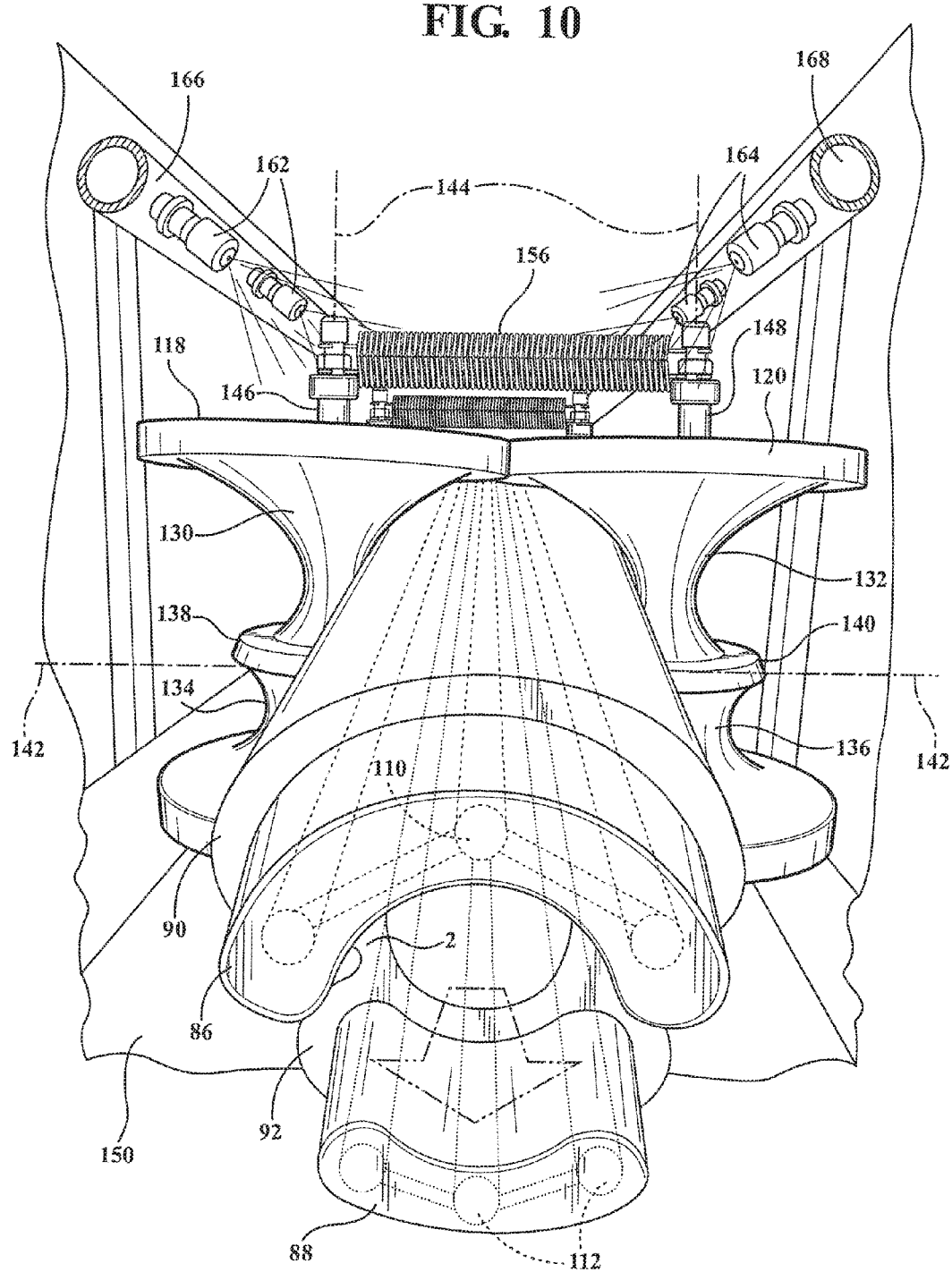
FIG. 10 is an end perspective of the forming mandrels extending from the die head into the cooling and final shaping tank and which transition the outer formed lobes and inner central sleeve to pairs of guiding spindles arranged linearly spaced fashion along the cooling and forming tank.
Figure 10A:
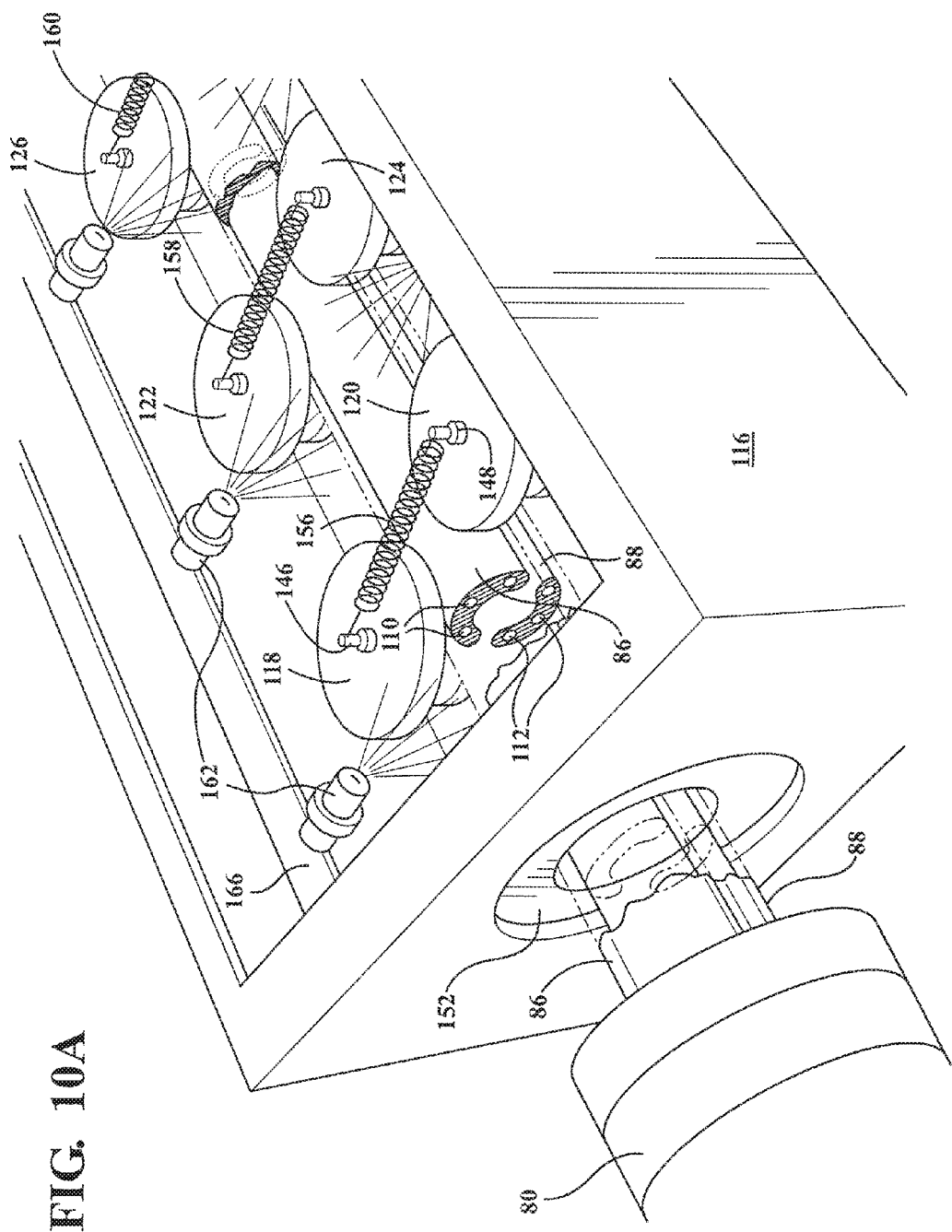
Figure 11:
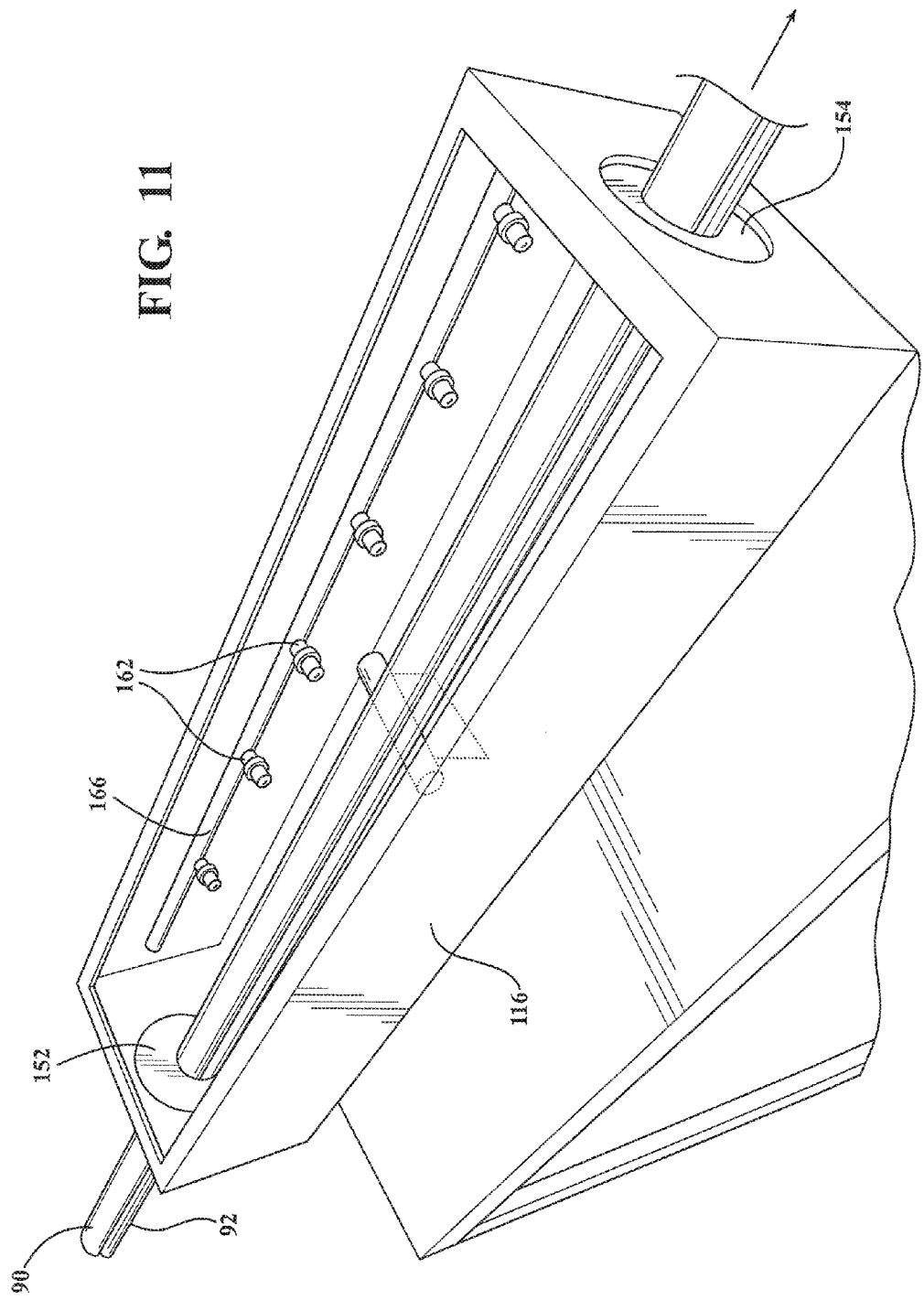
FIG. 11 is a further illustration of the cooling and shaping tank of FIG. 10A, again illustrating spray nozzles without the pairs of guiding spindles.

Although not clearly shown, the second extrudate material delivered through the pipe 84 (and such as which can again without limitation include an HDPE or other previously melted or flowable material) is communicated to an interior of the die head 80 which in turn configured to communicate the material via an inner profile or template such that it flows over and around the cross sectional kidney shape of each mandrel 86 and 88 for the extending length of the mandrels during which the second stage extruded lobes, see at 90 and 92 in end view of FIG. 10, also conjoin with circumferentially spaced apart surface locations of the previously extruded pipe 2, thereby forming a pair of individual passageway defining lobes upon the sleeve.

Figure 7:
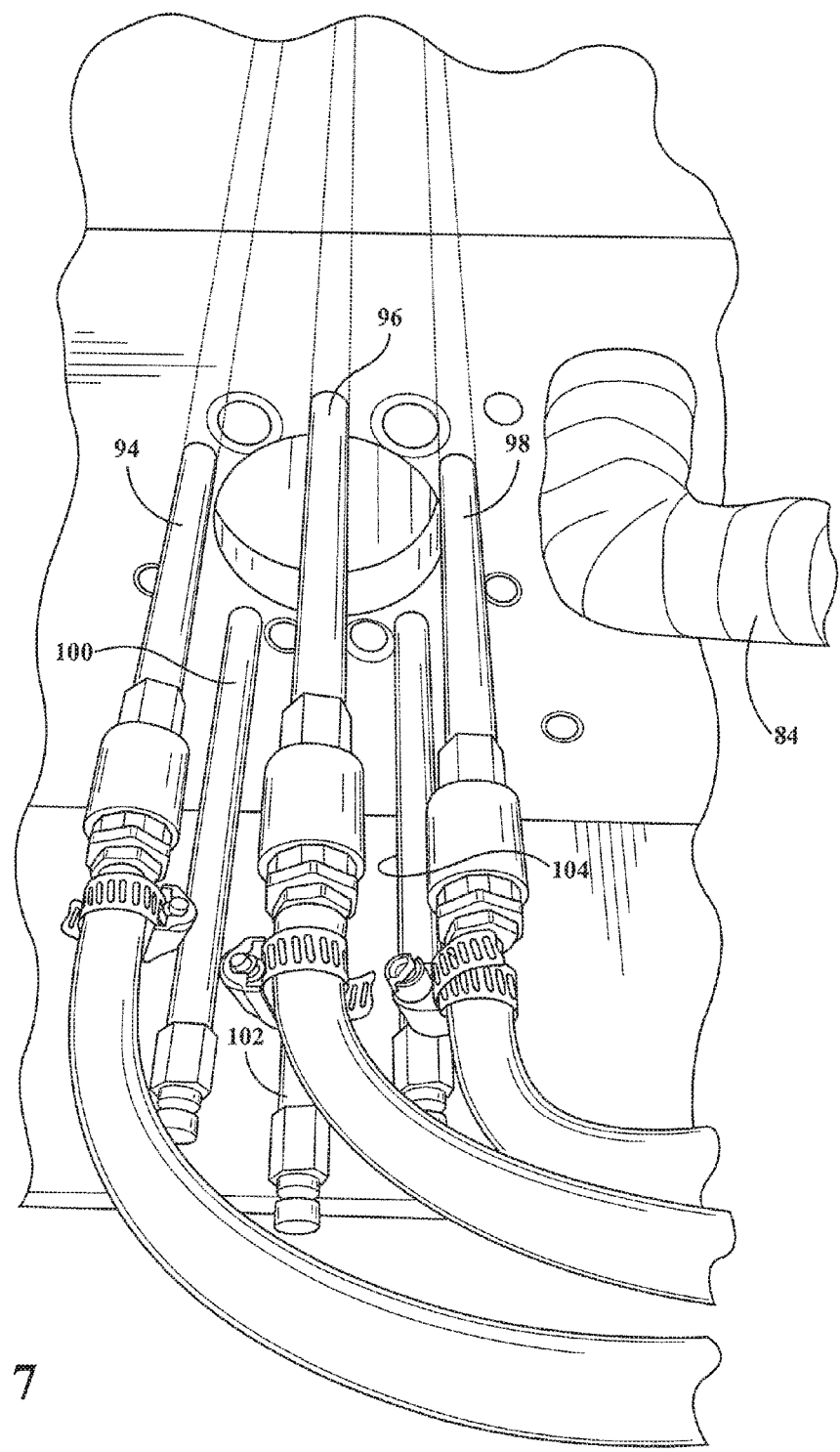
FIG. 7 is a rotated perspective of FIG. 6 and illustrating a plurality of cooling lines communicating to the cross head die and interior passageways formed into each of the elongated lobe forming mandrels for temperature control during the forming and attaching of the second extruded lobes to the previously extruded central sleeve.

The second extruder further includes independent temperature controls for each of the elongated mandrels 86 and 88, these assisting in shaping the attachment interface between the lobes 90 and 92 and central sleeve 2. The independent temperature controls for each of the elongated mandrels 86 and 88 further include pluralities of fluid lines, see as best shown in FIGS. 7 at 94, 96 and 98 for upper mandrel 86 and at 100, 102 and 104 for lower mandrel 88, for communicating a coolant to an interior of each of the mandrels 86 and 88, such as dictated by separate thermoelectric coupling devices in communication with the mandrels.

FIG. 8 is a back side perspective of the cross head die 80 and stand 82 and illustrating the arrangement of the inlet feed of coextruded and flowable material to the reverse (back) side extending mandrels 86 and 88, as well as the plurality of coolant lines 94-98 and 100-104 extending from a pair of fluid generating sub-assemblies (see as represented at 106 and 108 which may include internal pumps or the like for assisting in generating fluid flow through the mandrels) and for controlling the temperature profiles of the mandrels. A pair of passageway defining networks (see at 110 for upper mandrel 86 and at 112 for lower mandrel 88) are provided along the extending interior of the mandrels and to which the pluralities 94-98 and 100-104 of fluid lines are communicated, this in order to control the temperature of the mandrels during the second stage extrusion process. Also shown in FIG. 8 at 114 is a separate unit which may include any type of Thermalator® or thermo-electric coupling controls, these interfacing with the pump controlled upper 106 and lower 108 coolant subassemblies and associated valve structure in communicating with the fluid lines 94-98 and 100-104 in order to direct fluid through the interior of the mandrels 86 and 88.

In this manner, the surface temperatures of the mandrels 86 and 88 are independently controlled so as to assist in shaping and smoothing the inner wall of each extruded lobe 90 and 92 of material as it is joined about the exterior perimeter of the previously extruded single walled pipe 2. At this point, the heat associated previous cross sectional offset 2' or correction effectuated by the intercepting upper 36 and lower spaced apart 38 and 40 rollers into the cross sectional profile of the pipe is further deformed by the heat of the mandrels 86 and 88 in the second stage extrusion process, such resulting in the creation of a two stage extruded pipe in which the inner single walled component reverts back to a substantially symmetrical and circular cross sectional shape.

Although not clearly shown, it is also understood that the linear dimensions of the mandrels 86 and 88 can be tapered or otherwise modified, such including an inward taper of 6% in one non-limiting variant between the crosswise dimensions taken from the cross head die 80 to the extending ends of the mandrels. The dimensioning of the mandrels is intended to counter the natural phenomena effects of the HDPE extrudate material for the lobes as it is formed, conjoined and hardened to the exterior of the single walled pipe 2 and so that the resultant two stage extruded pipe exhibits consistent length and width dimensional profiles.

The mandrels 86 and 88 extend from cross head die 80 and into an interior of a cooling station 116. The cooling station 116 further includes a plurality of linearly spaced apart pairs of supporting spindles see at 118/120, 122/124, 126/128 et seq., between which traverses the two stage extruded pipe. As further best shown in FIG. 10B, the mandrels 86 and 88 extend between at least the first two pairs of spaced apart spindles 118/120 and 122/124 during the progressive second stage extrusion of lobes 90 and 92 on the single walled pipe 2.

The pairs of spindles each exhibit a modified spool shape, see as best shown in end view of FIG. 10, with each including a pair of upper 130/132 and lower 134/136 arcuate surfaces separated at an intermediate height by an annular ledge 138 and 140. The shaping of the spindles is such that the extruded profile of the upper/lower lobes 90 and 92 formed by the mandrels 86 and 88 ride between the upper and lower arcuate opposing surfaces of the pairs of spindles, with the cross sectional separation between the lobes and the central pipe 2 seating between the likewise opposing intermediate ledge of each spindle.

The construction of the spindles, such including a metallic or any suitable supporting material, is also such that the spindles are capable of being inter-displaceable in at least one of first x 142 and second y 144 axes in response to contact with the pipe as it is displaced therebetween. X axis displacement can be effectuated by rotatably supporting the spindles upon vertical mounting posts 146 and 148, these extending upwardly from a base interior surface 150 of the cooling station 116 (likewise exhibited as an elongated three dimensional rectangular shaped structure with a generally open interior and having an inlet end 152 and an outlet end 154).

As further shown, a plurality of coil springs (see at 156, 158, 160 et seq.) equal in number to each respective pair of guiding spindles is provided and each includes opposite curled ends which engage the upper ends of each pair of vertical spindle support posts (again at 146 and 148 in FIG. 10). The posts can be configured so that they are allowed an incremental degree of lateral give or displacement (along axis x 142) in response to incidental contact between the extruded pipe and the spindles, thereby allowing the spindles to flex laterally against the biasing effect of the coil springs. As further clearly shown, y axis 144 displacement of the spindles is further easily accomplished by their vertical channel seating interiors (not shown but through which the posts extend) allowing the spindles to slide up and down along the vertical posts 146/148.

The cooling station 116 further includes pluralities of nozzles, see at 162 and 164 and which are supported on opposite interior extending sides of the station 116 via fluid supply lines 166 and 168 (these in turn connected to remote coolant supply reservoirs) for supplying a spray coolant to the two stage extruded pipe as it translates through the station 116. As with the initial stage cooling station 60, spray coolant is collected at an interior drain basin within the station and recycled or drained as desired.

Following exiting from the cooling station 116, the completed two stage extruded pipe 170 is drawn through a puller 172 (FIG. 12) for sectioning at a subsequent operation 174 (also depicted by blade 174 in FIG. 12) the finished pipe into predetermined lengths. Finally, and referencing FIG. 13, a router station 176 or the like is provided (can be part of a stand-alone arrangement apart from the operational schematic of FIG. 1) and which is configured to aperture or router any hole, slot/channel or other perforation within the exposed linear extending portion of the central sleeve 2, such as for facilitating grout outflow during subsequent in ground installation.

Without limitation, the sizing and shaping or cross sectional dimensioning of the exterior lobes 90 and 92 are not limited to that shown and in which the down/inflow lobe 90 exhibits a larger inner area in comparison to the up/outflow lobe 92, this in order to maintain desired directional fluid flow as well as to optimize the thermodynamics associated with the geothermal conditioned fluid delivered to the associated heat transfer (not shown) or other suitable output equipment mounted in fluidic communication with the outflow lobe. It is also envisioned that any suitable guide shape retention, cold-water immersion hardening, cutting and cross drilling steps may also disclosed for creating a plurality of individual sections for ease of transport and on site assembly, such as utilizing hot plate welding techniques for joining previously sectioned lengths of finished pipe. Additional top and bottom affixed caps (not shown) are affixed to ends of the elongate assembled piping and, upon embedding the assembly within a ground location in interfacing fashion with a geothermal environment, provide a communicating fluid flow both downward and return/upwardly with temperature alteration of the inner communicated fluid flow prior to delivery to such as a suitable piece of heat expansion and energy transfer equipment, not limited to that previously described in the background description and, in one application, such as specifically for creating electricity.

An associated process for creating a two stage extruded pipe is also provided and includes the steps of extruding a first sleeve shaped and elongated component, and sizing the sleeve shaped component within a chamber incorporating a series of linearly spaced sizing dies in order to maintain a shape of the first sleeve shaped component during cooling thereof. Additional steps include extruding a pair of outer lobes to exterior surfaces of the sleeve shaped component at displaced circumferential locations so that the lobes each define a separate passageway and further so that the lobes do not contact one another, thereby revealing first and second exposed portions of the sleeve shaped component. Other steps include cooling the two stage extruded pipe and sectioning the pipe into given lengths.

Other process steps drawn from the above assembly include inducing a negative pressure within the chamber, flattening first and second cross sectional locations of the sleeve shaped component prior to the step of extruding the outer lobes, and cooling the sleeve shaped component prior to extruding the pair of outer lobes. Additional steps include independently controlling a temperature of each of the pair of elongated lobe forming mandrels forming a portion of a crosshead die associated with the second stage extrusion, such including the use of coolant and thermos-electric coupling devices (or Thermalators®), and transitioning the pipe from the elongated lobe forming mandrels to a plurality of spaced apart pairs of supporting spindles during traversing of the pipe through a second chamber downstream from the crosshead die. Final process steps also include routing at least one exposed portion of the sleeve shaped component following the steps of extruding the outer lobes and cooling the two stage extruded pipe.

Having described our invention, other and additional preferred embodiments will become apparent to those skilled in the art to which it pertains, and without deviating from the scope of the appended claims. This can include such as combining the dies and patterns for creating the outer arcuate lobes into a single co-extruded die component, as well as producing a co-extruded article in which the dies are reconfigured for producing a single lobe or other multiple numbers of lobes around the central and initially extruded sleeve.

We claim:

1. A process for creating a two stage extruded pipe, comprising the steps of:
   extruding in a first sleeve shaped and elongated component;
   sizing the sleeve shaped component within a chamber incorporating a series of linearly spaced sizing dies in order to maintain a shape of the first sleeve shaped component during cooling thereof;
   extruding in a second stage a pair of outer lobes to exterior surfaces of the sleeve shaped component at displaced circumferential locations so that the lobes each define a separate passageway and further so that the lobes do not contact one another, thereby revealing first and second exposed portions of the sleeve shaped component;
   cooling the two stage extruded pipe; and
   sectioning the pipe into given lengths.

2. The process as described in claim 1, said step of sizing the sleeve shape component further comprising inducing a negative pressure within the chamber.

3. The process as described in claim 1, further comprising the step of flattening first and second cross sectional locations of the sleeve shaped component prior to the step of extruding the outer lobes.

4. The process as described in claim 1, further comprising the step of cooling the sleeve shaped component prior to extruding the pair of outer lobes.

5. The process as described in claim 1, said step of extruding the pair of outer lobes to exterior surfaces of the sleeve shaped component further comprising the step of independently controlling a temperature of each of a pair of elongated lobe forming mandrels forming a portion of a crosshead die associated with the second stage extrusion.

6. The process as described in claim 5, said step of controlling a temperature of each of the elongated lobe forming mandrels further comprising the step of communicating a coolant to an interior of each of the mandrels.

7. The process as described in claim 5, said step of cooling the two stage extruded pipe further comprising the step of transitioning the pipe from the elongated lobe forming mandrels to a plurality of spaced apart pairs of supporting spindles during traversing of the pipe through a second chamber downstream from the crosshead die.

8. The process as described in claim 1, further comprising the step of aperturing at least one exposed portion of the sleeve shaped component following the steps of extruding the outer lobes and cooling the two stage extruded pipe.

9. The process as described in claim 1, said step of cooling the first sleeve shaped extruded component further comprising spraying within a first cooling tank.

10. The process as described in claim 7, said step of cooling the second stage extruded outer lobes to the exterior surface of the sleeve shaped component further comprising spraying the two stage extruding pipe in the second chamber.

11. A process for creating an extruded pipe, comprising the steps of:
    extruding a first sleeve shaped and elongated component;
    sizing the sleeve shaped component within a chamber incorporating a series of linearly spaced sizing dies in order to maintain a shape of the first sleeve shaped component during cooling thereof;
    extruding a pair of outer lobes to exterior surfaces of the sleeve shaped component at displaced circumferential locations so that the lobes each define a separate passageway and further so that the lobes do not contact one another, thereby revealing first and second exposed portions of the sleeve shaped component;
    cooling the extruded pipe;
    aperturing at least one exposed portion of the sleeve shaped component following the steps of extruding the outer lobes and cooling the extruded pipe; and
    sectioning the pipe into given lengths.

\* \* \* \* \*